US012057705B1

(12) United States Patent
Chen et al.

(10) Patent No.: US 12,057,705 B1
(45) Date of Patent: Aug. 6, 2024

(54) POWER CONTROL METHOD FOR WIND POWER AND PHOTOVOLTAIC COMBINED POWER GENERATION (71) Applicants: HUANENG SHANXI COMPREHENSIVE ENERGY CO., LTD., Taiyuan (CN); HUANENG YUSHE POVERTY ALLEVIATION ENERGY CO., LTD., Jinzhong (CN); Huaneng Shanxi Comprehensive Energy Co., Ltd. Yushe Photovoltaic Power Station, Jinzhong (CN); LICHENG YINGHENG CLEAN ENERGY CO., LTD., Changzhi (CN); HUANENG RUICHENG COMPREHENSIVE ENERGY CO., LTD., Yuncheng (CN); HUANENG ZUOQUAN YANGJIAO WIND POWER CO., LTD., Jinzhong (CN); RUICHENG NINGSHENG NEW ENERGY CO., LTD., Yuncheng (CN); WUZHAI TAIZHONG NEW ENERGY WIND POWER GENERATION CO., LTD., Xinzhou (CN); SHUOZHOU TAIZHONG WIND POWER GENERATION CO., LTD., Shuozhou (CN)

(72) Inventors: Yanjun Chen, Taiyuan (CN); Yamin Chang, Taiyuan (CN); Yong Chen, Taiyuan (CN); Zhuanghua Zhu, Taiyuan (CN); Jianhua Liu, Taiyuan (CN)

(73) Assignees: HUANENG SHANXI COMPREHENSIVE ENERGY CO., LTD., Taiyuan (CN); HUANENG YUSHE POVERTY ALLEVIATION ENERGY CO., LTD., Jinzhong (CN); HUANENG SHANXI COMPREHENSIVE ENERGY CO., LTD. YUSHE PHOTOVOLTAIC POWER STATION, Jinzhong (CN); LICHENG YINGHENG CLEAN ENERGY CO., LTD., Changzhi (CN); HUANENG RUICHENG COMPREHENSIVE ENERGY CO., LTD., Yuncheng (CN); HUANENG ZUOQUAN YANGJIAO WIND POWER CO., LTD., Jinzhong (CN); RUICHENG NINGSHENG NEW ENERGY CO., LTD., Yuncheng (CN); WUZHAI TAIZHONG NEW ENERGY WIND POWER GENERATION CO., LTD., Xinzhou (CN); SHUOZHOU TAIZHONG WIND POWER GENERATION CO., LTD., Shuozhou (CN)

( * ) Notice: Subject to any disclaimer, the term of this patent is extended or adjusted under 35 U.S.C. 154(b) by 0 days.

(21) Appl. No.: 18/638,706

(22) Filed: Apr. 18, 2024

Related U.S. Application Data (63) Continuation of application No. PCT/CN2023/114579, filed on Aug. 24, 2023.

(30) Foreign Application Priority Data

Aug. 25, 2022 (CN) .......................... 202211026862.2

(51) Int. Cl.
H02J 3/46 (2006.01)

(52) U.S. Cl.
CPC ............. *H02J 3/46* (2013.01); *H02J 2300/24* (2020.01); *H02J 2300/28* (2020.01)

(58) Field of Classification Search
CPC ....... H02J 3/46; H02J 2300/28; H02J 2300/24
See application file for complete search history.

(56) References Cited

U.S. PATENT DOCUMENTS

2022/0170648 A1   6/2022   Hodges

FOREIGN PATENT DOCUMENTS

| CN | 101286655 A | 10/2008 |
| CN | 103684214 A | 3/2014 |

(Continued)

OTHER PUBLICATIONS

Chenxi Wu et al., Probabilistic load flow of power system with WFs, PVs and PEVs, "Electric Power Automation Equipment" vol. 33, No. 10, published date Oct. 10, 2013 (9 pages).

(Continued)

*Primary Examiner* — Robert L Deberadinis (57) ABSTRACT

The disclosure relates to the technical field of power control, a power control method for wind power and photovoltaic combined power generation is provided, and includes: obtaining wind parameters and light intensity parameters of a wind power photovoltaic combined power generation system, and simultaneously obtaining a current operation characteristic of the power generation system; determining a (Continued)

first power adjustment amount for the power generation system based on the wind parameters, and determining a second power adjustment amount for the power generation system based on the light intensity parameters; obtaining an optimal power ratio condition under the current operation characteristic; determining a power control instruction for a current power output value of the power generation system based on the first power adjustment amount and the second power adjustment amount according to the optimal power ratio condition, and performing power control on power units in the power generation system.

8 Claims, 1 Drawing Sheet

(56) References Cited

FOREIGN PATENT DOCUMENTS

| CN | 104377736 | A | 2/2015 |
|---|---|---|---|
| CN | 107565610 | A | 1/2018 |
| CN | 108306331 | A | 7/2018 |
| CN | 108448655 | A | 8/2018 |
| CN | 109638885 | A | 4/2019 |
| CN | 109787237 | A | 5/2019 |
| CN | 211457062 | U | 9/2020 |
| CN | 113285655 | A | 8/2021 |
| CN | 113610374 | A | 11/2021 |
| CN | 113659638 | A | 11/2021 |
| CN | 114389272 | A | 4/2022 |
| CN | 114567020 | A | 5/2022 |
| CN | 115117944 | A | 9/2022 |
| WO | 2019193837 | A1 | 10/2019 |

OTHER PUBLICATIONS

Xiaoming Cui et al., Research on Maximum Power Point Tracking Control for Small-scale Wind/PV Hybrid Generation Systems, "Computer Knowledge and Technology", vol. 7, Issue 21, published date Jul. 25, 2011 (3 pages).

Xianbo Ke et al., Design of a wind power and photovoltaic emergency power control system for Northwest China Grid, "Electric Power Engineering Technology" vol. 40, Issue 2, published date Mar. 28, 2021 (8 pages).

CNIPA, First Office Action issued for Chinese Application No. 202211026862.2, mailed Oct. 10, 2022 (17 pages).

Notification to Grant Patent Right for Invention, Chinese Application No. 202211026862.2, mailed Oct. 24, 2022 (7 pages).

International Search Report issued in corresponding International application No. PCT/CN2023/114579, mailed Nov. 29, 2023 (8 pages).

POWER CONTROL METHOD FOR WIND POWER AND PHOTOVOLTAIC COMBINED POWER GENERATION

CROSS-REFERENCE TO RELATED APPLICATIONS

This patent application is a national stage application of International Patent Application No. PCT/CN2023/114579 filed on Aug. 24, 2023, which claims priority of Chinese Patent Application No. 202211026862.2 filed on Aug. 25, 2022, which is incorporated by reference herein in its entirety as part of the present application.

TECHNICAL FIELD

The disclosure relates to the technical field of power control, in particular to a power control method for wind power and photovoltaic combined power generation.

BACKGROUND

Wind power and photovoltaic have complementary advantages and are the right-hand man of renewable energy system. Wind power and photovoltaic are intermittent power sources, and their power output is random and fluctuating, which is unfriendly to photovoltaic power grid connection and wind power grid connection, and has natural disadvantages compared with thermal power. However, the complementarity of wind and photovoltaic can reduce the influence on the reliability and stable operation of power grid to a certain extent.

However, in the process of operation, wind power and photovoltaic have certain limitations in power adjustment, which will make wind power and photovoltaic have a certain operational disadvantage.

Therefore, the disclosure provides a power control method for wind power and photovoltaic combined power generation.

SUMMARY

The disclosure provides a power control method for wind power and photovoltaic combined power generation. By combining a first power adjustment amount obtained by wind parameters and a second power adjustment amount obtained by light intensity parameters with the optimal power ratio condition, the effective adjustment of power is realized, and the high efficiency of wind power and photovoltaic combined operation is ensured.

The power control method for wind power and photovoltaic combined power generation is provided, and includes:
- step 1: obtaining wind parameters and light intensity parameters of a wind power photovoltaic combined power generation system, and simultaneously obtaining a current operation characteristic of the power generation system;
- step 2: determining a first power adjustment amount for the power generation system based on the wind parameters, and determining a second power adjustment amount for the power generation system based on the light intensity parameters;
- step 3: obtaining an optimal power ratio condition under the current operation characteristic;
- step 4: determining a power control instruction for a current power output value of the power generation system based on the first power adjustment amount and the second power adjustment amount according to the optimal power ratio condition, and performing power control on power units in the power generation system;

In some embodiments, the obtaining wind parameters and light intensity parameters of the wind power photovoltaic combined power generation system includes:
- obtaining a system structure diagram of the power generation system and a position structure diagram of the power generation system;
- performing first analysis on the power generation system based on the system structure diagram to determine a first position to be set based on the power generation system;
- performing a second analysis on the power generation system based on the position structure diagram to determine a second position to be set based on the power generation system;
- obtaining historical environmental information of a position of the power generation system being located, analyzing the historical environmental information, classifying environmental occurrence states, and respectively determining a detection bias corresponding to each type of occurrence states;
- setting third positions to be detected corresponding to each type of occurrence states based on the detection bias and combined with the position structure diagram, and setting a state-bias weight for each of the third positions to be detected;
- screening a first sub-position with the state-bias weight corresponding to each type of occurrence states greater than a preset weight, and simultaneously overlapping labeling the third positions to be detected corresponding to each type of occurrence states to obtain a second sub-positions;
- analyzing a setting feasibility of each of the second sub-positions, and screening to obtain a third sub-position;

$$Y1 = (1-\alpha) \times \sum_{i1=1}^{n1} r_{i1} \times e^{\sum_{i1=1}^{n1} p_{i1}};$$

where, Y1 represents the setting feasibility corresponding to the second sub-positions; $\alpha$ represents a calculation error factor for a calculation of feasibility, and a value range is [0, 0.01]; n1 represents a number of overlapping times corresponding to the second sub-positions; $r_{i1}$ represents a state-bias weight corresponding to an i1 overlapping label in corresponding to the second sub-positions; $p_{i1}$ represents an occurrence probability of a weather state corresponding to the i1 overlapping label in corresponding to the second sub-positions;
- determining a light deployment and a wind deployment of the third sub-position based on the power generation system, and analyzing a first influence result of the light deployment based on the first position to be set and a second influence result of the wind deployment based on the second position to be set;
- determining adjustment information based on the first influence result and the second influence result according to a result analysis mechanism;
- removing redundant overlapping positions from the first position to be set, the second position to be set, the first sub-position and the third sub-positions to obtain a setting position to be confirmed;

performing device adjustment on the setting position to be confirmed based on the adjustment information to obtain a device setting position;

performing a wind power detection and a light intensity detection according to a light intensity detection sensor and a wind intensity detection sensor set at the device setting position to obtain corresponding the wind parameters and the light intensity parameters.

In some embodiments, the determining adjustment information based on the first influence result and the second influence result according to the result analysis mechanism includes:

constructing a first influence feature of the first influence result and a second influence feature of the second influence result based on the result analysis mechanism;

calculating a feature similarity SimA of the first influence feature and the second influence feature;

$$A=\{sim(s1_{j1},s2_{j2}),j1=1,2,3,\ldots,n1;j2=1,2,3,\ldots,n2\};$$

simultaneously screening a feature pair corresponding to first n minimum similarity features, and respectively calculating a total weight corresponding to the feature pair;

calculating a number of additions according to a following formula when the total weight is greater than a preset threshold;

$$H1 = \left[\frac{Q_{ZONG}}{Q_Y} \times (1-simB)\right];$$

where H1 represents the number of additions corresponding to a corresponding feature pair B; $Q_{ZONG}$ represents the total weight of the corresponding feature pair B; $Q_Y$ represents the preset threshold; simB represents the feature similarity of the corresponding feature pair B; [ ] represents an integer symbol;

respectively performing a same number of additions of light intensity detection sensors and wind intensity detection sensors to the power generation system according to a total number of additions;

otherwise, judging that no additional sensor is required.

In some embodiments, the obtaining a current operation characteristic of the power generation system includes:

obtaining a first connection layout of a wind power photovoltaic receiving end and a second connection layout of a wind power photovoltaic converting end in the power generation system;

determining current wind collection data and current light collection data, and simultaneously determining a wind battery pack usage situation and a light battery pack usage situation in the power generation system;

performing a first processing on the current wind collection data and the wind battery pack usage situation based on the first connection layout and the second connection layout, and simultaneously performing a second processing the current light collection data and the light battery pack usage situation;

determine a first target power according to the wind battery pack usage situation, and simultaneously determining a second target power according to the light battery pack usage situation;

comparing the first target power and the second target power with a mode power of a current working mode of the power generation system to determine a power difference sequence group of the power generation system;

determining a collection-use sequence group according to a first processing result and a second processing result;

determining the current operation characteristic of the power generation system based on the power difference sequence group and based on the collection-use sequence group.

In some embodiments, the determining the first power adjustment amount for the power generation system based on the wind parameters includes:

constructing a first collection array based on the wind parameters;

performing a parameter analysis on the first collection array to obtain an allowable maximum power and an allowable minimum power;

obtaining a first operation power based on a wind power generation in the power generation system;

when the first operation power is less than the allowable minimum power corresponding to the first collection array, obtaining a first difference value corresponding to the two as a first power adjustment amount;

when the first operation power is less than the allowable maximum power corresponding to the first collection array and greater than the allowable minimum power corresponding to the first collection array, obtaining a second difference value of the first operation power based on the allowable maximum power corresponding to the first collection array and a third difference value based on the allowable minimum power corresponding to the first collection array;

obtaining a larger difference value between the second difference value and the third difference value, adjusting the larger difference value according to a proportion of concentrated parameters of the first collection array, and superimposing the larger difference value based on the allowable minimum power and a adjusted difference value, and taking a fourth difference value between a superposition result and the first operation power as the first power adjustment amount.

In some embodiments, the obtaining the optimal power ratio condition under the current operation characteristic includes:

determining a first power generation value related to a wind power generation, and simultaneously determining a second power generation value related to a photovoltaic power generation according to the current operation characteristic;

determining a power generation ratio based on the first power generation value and the second power generation value, and simultaneously obtaining a standard ratio of the power generation system;

performing a value comparison, a molecular comparison and a denominator comparison based on the power generation ratio and the standard ratio, optimizing the power generation ratio to obtain the optimal power ratio condition.

In some embodiments, the determining a power control instruction for a current power output value of the power generation system based on the first power adjustment amount and the second power adjustment amount according to the optimal power ratio condition includes:

obtaining the current power output value of the power generation system;

obtaining an initial wind power and an initial photovoltaic power of the power generation system;

simultaneously obtaining power loss factors of the power generation system;

obtaining a first ratio based on the initial wind power and the first power adjustment amount and the initial photovoltaic power and the second power adjustment amount, and adjusting the first ratio based on the power loss factors to obtain a second ratio;

comparing the second ratio with the optimal power ratio condition to determine difference information, and combining the current power output value to generate the power control instruction.

In some embodiments, the performing power control on power units in the power generation system includes:

screening a first opening unit and a first power unit from a wind power unit based on the first power adjustment amount and according to a minimum loss standard, and meanwhile, screening a second opening unit and a second power unit from a photovoltaic unit based on the second power adjustment amount and according to the minimum loss standard;

analyzing the power control instruction and configuring corresponding control codes to each of units;

controlling a corresponding unit to perform a power adjustment operation based on the control codes.

In some embodiments, the adjusting the first ratio based on the power loss factors to obtain the second ratio includes:

$$Y4 = Y0 \times (1 - e^{-\Sigma h});$$

where, Y0 represents the first ratio; Σh represents all the power loss factors; $1 - e^{-\Sigma h}$ represents a ratio adjustment coefficient; Y4 represents the second ratio.

Other features and advantages of the disclosure will be set forth in the description which follows, and in part will be apparent from the description, or may be learned by practice of the disclosure. The objects and other advantages of the disclosure may be realized and obtained by the structure particularly pointed out in the written specification, claims and drawings.

The technical scheme of the disclosure will be further described in detail through the attached drawings and embodiments.

BRIEF DESCRIPTION OF THE DRAWINGS

The accompanying drawings are used to provide a further understanding of the disclosure and form a part of the specification. The accompanying drawings, together with the embodiments of the disclosure, are used to explain the disclosure and do not constitute a limitation of the disclosure. In the attached drawings.

DETAILED DESCRIPTION OF THE EMBODIMENTS

Hereinafter, the preferred embodiments of the disclosure will be described with reference to the drawings, and it should be understood that the preferred embodiments described here are only used to illustrate and explain the disclosure, and are not used to limit the disclosure.

Figure 1:
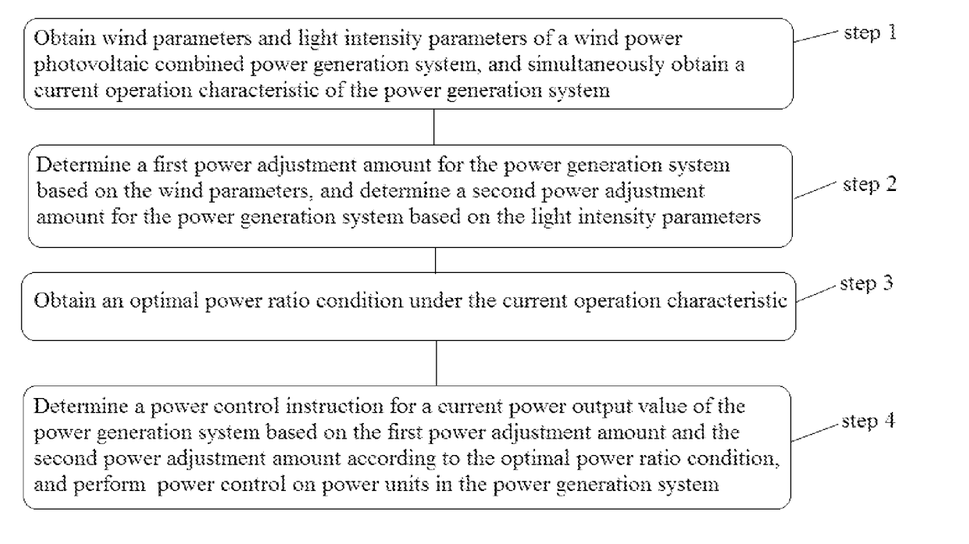
FIG. 1 is a flowchart of a power control method for wind power and photovoltaic combined power generation according to embodiments of the disclosure.

A power control method for wind power and photovoltaic combined power generation is provided, as shown in FIG. 1, and includes the following steps:

step 1: wind parameters and light intensity parameters of a wind power photovoltaic combined power generation system are obtained, and a current operation characteristic of the power generation system is simultaneously obtained;

step 2: a first power adjustment amount for the power generation system based on the wind parameters is determined, and a second power adjustment amount for the power generation system based on the light intensity parameters is determined;

step 3: an optimal power ratio condition under the current operation characteristic is obtained;

step 4: a power control instruction for a current power output value of the power generation system based on the first power adjustment amount and the second power adjustment amount is determined according to the optimal power ratio condition, and power units in the power generation system are performed power control.

In the embodiments, the wind parameters are related to wind intensity, and the light intensity parameters are related to light intensity.

In the embodiments, the current operation characteristic is mainly related to the current operation mode of the system and the corresponding operation power and other parameters in this mode.

In the embodiments, different power adjustment amounts are determined by wind parameters and light intensity parameters, which provides a basis for subsequent implementation of power control.

In the embodiments, the optimal power ratio condition refers to the proportion of powers corresponding to wind power and photovoltaic.

In the embodiments, the first power adjustment amount refers to determining the power adjustment situation of the power generation system based on the wind parameters, and the second power adjustment amount refers to determining the power adjustment situation of the power generation system based on the photovoltaic parameters.

In the embodiments, the power control instruction refers to an adjustment of the power of different power units, such as turning on or off the current-voltage resistance-related switch to realize power adjustment, or turning on some previous units to comprehensively operate with the current power generation system.

The above technical scheme has the following beneficial effects: the first power adjustment amount obtained by wind parameters and the second power adjustment amount obtained by light intensity parameters are combined with the optimal power ratio condition to realize effective adjustment of the power and ensure the high efficiency of combined operation of wind power and photovoltaic.

The power control method for wind power and photovoltaic combined power generation is provided, obtaining wind parameters and light intensity parameters of the wind power photovoltaic combined power generation system includes the following steps:

a system structure diagram of the power generation system and a position structure diagram of the power generation system are obtained;

the power generation system is performed a first analysis based on the system structure diagram to determine a first position to be set based on the power generation system;

the power generation system is performed a second analysis based on the position structure diagram to determine a second position to be set based on the power generation system;

historical environmental information of a position of the power generation system being located is obtained, the historical environmental information is analyzed, environmental occurrence states are classified, and a detection bias corresponding to each type of occurrence states is respectively determined;

third positions to be detected corresponding to each type of occurrence states are setted based on the detection bias and combined with the position structure diagram, and a state-bias weight is setted for each of the third positions to be detected;

a first sub-position with the state-bias weight corresponding to each type of occurrence states greater than a preset weight is screened, and simultaneously, the third positions to be detected corresponding to each type of occurrence states are overlapped and labeled to obtain second sub-positions;

a setting feasibility of each of the second sub-positions is analyzed, and is screened to obtain a third sub-position;

$$Y1 = (1-\alpha) \times \sum_{i1=1}^{n1} r_{i1} \times e^{\sum_{i1=1}^{n1} p_{i1}};$$

where, Y1 represents the setting feasibility corresponding to the second sub-positions; $\alpha$ represents a calculation error factor for a calculation of feasibility, and a value range is [0, 0.01]; n1 represents a number of overlapping times corresponding to the second sub-positions; $r_{i1}$ represents a state-bias weight corresponding to an i1 overlapping label in corresponding to the second sub-positions; $p_{i1}$ represents an occurrence probability of a weather state corresponding to the i1 overlapping label in corresponding to the second sub-positions;

a light deployment and a wind deployment of the third sub-position based on the power generation system are determined, and a first influence result of the light deployment based on the first position to be set and a second influence result of the wind deployment based on the second position to be set are analyzed;

adjustment information based on the first influence result and the second influence result is determined according to a result analysis mechanism;

redundant overlapping positions are removed from the first position to be set, the second position to be set, the first sub-position and the third sub-positions to obtain a setting position to be confirmed;

the setting position to be confirmed is performed device adjustment based on the adjustment information to obtain a device setting position;

a wind power detection and a light intensity detection are performed according to a light intensity detection sensor and a wind intensity detection sensor set at the device setting position to obtain corresponding the wind parameters and the light intensity parameters.

In the embodiments, both the system structure diagram and the position structure diagram are obtained in advance, and the system structure diagram refers to the circuit connection diagram of the power generation system, and the position structure diagram refers to the structure diagram of the geographical location where the power generation system is located.

In the embodiments, the first analysis mainly analyzes the circuit to obtain the position to be set, and the second analysis mainly analyzes the geographical position to obtain the position to be set.

In the embodiments, the environmental occurrence states refer to the historical environmental changes in the geographical position, such as weather changes, heavy rain, cloudy, strong wind, etc., and then the states is classified to determine the detection bias of each type of states, such as bad weather bias and normal weather bias.

In the embodiments, the third detection position is mainly set based on weather bias, and the weight of the corresponding setting position is different with different weather bias. In the embodiments, the preset weights are preset.

In the embodiments, overlapping labeling refers to labeling the overlapping positions after determining the positions of different types of occurrence states, such as: the first type: positions 1, 2 and 3, the second type: positions 2, 3 and 4, and the third type: positions 1, 6 and 7. At this time, positions of the overlapping labels are positions 1, 2 and 3.

In the embodiments, the setting feasibility of the second sub-positions is mainly determined based on the number of overlapping times.

In the embodiments.

$$\sum_{i1=1}^{n1} P_{i1}$$

is less than 1, and n1 is a variable and greater than 1.

In the embodiments, the light deployment and the wind deployment refer to the setting layout of photovoltaic system and wind power system based on the power generation system.

In the embodiments, the first influence result refers to an influence of light deployment based on the first position to be set in the system structure diagram, that is, the photovoltaic setting is based on the power influence of the whole first position to be set.

In the embodiments, the second influence result refers to an influence of wind deployment based on the second position to be set in the position structure diagram, that is, the wind power setting is based on the power influence of the whole second position to be set.

In the embodiments, the final purpose of the first influence result and the second influence result is to adjust the number of sensors arranged in the position to realize the setting of sensors, for example, the light deployment and the wind deployment. The adjustment information of the position to be set adopts the adjustment manner of setting a plurality of detection devices in position 1, that is, the way of setting the position of the device can include setting a plurality of detection devices in one position.

In the embodiments, the result analysis mechanism is mainly to analyze the combination of different influence results to obtain the adjustment information related to the number of devices.

The above technical scheme has the following beneficial effects: according to two ways, corresponding setting positions of different structure diagrams are determined respectively; through classifying the environmental occurrence states, the detection bias is determined, and then the setting feasibility of the sub-position is calculated. The influence result based on the position to be set is determined by light deployment and wind deployment, and then the adjustment information is obtained according to the result analysis mechanism, so as to realize the total number setting of sensors in the setting position to be confirmed, and further ensure the reasonable setting of sensors, ensure the reliability of detection results, and provide an effective basis for subsequent power adjustment.

The power control method for wind power and photovoltaic combined power generation is provided, the determining adjustment information based on the first influence result and the second influence result according to the result analysis mechanism includes:

based on the result analysis mechanism, a first influence feature of the first influence result is constructed and a second influence feature of the second influence result is constructed;

feature similarity SimA of the first influence feature and the second influence feature are calculated;

$$A=\{sim(s1_{j1},s2_{j2}), j1=1,2,3, \ldots, n1; j2=1, 2,3,\ldots,n2\};$$

a feature pair corresponding to first n minimum similarity features is simultaneously screened, and a total weight corresponding to the feature pair is respectively calculated;

when the total weight is greater than a preset threshold, a number of additions is calculated according to a following formula:

$$H1 = \left[\frac{Q_{ZONG}}{Q_Y} \times (1 - simB)\right];$$

where H1 represents the number of additions corresponding to a corresponding feature pair B; $Q_{ZONG}$ represents the total weight of the corresponding feature pair B; $Q_Y$ represents the preset threshold; simB represents the feature similarity of the corresponding feature pair B; [ ] represents an integer symbol;

a same number of additions of light intensity detection sensors and wind intensity detection sensors are respectively performed to the power generation system according to a total number of additions;

otherwise, it is judged that no additional sensor is required.

In the embodiments, the influence features are all obtained based on the influence results, and the feature similarity is calculated by similarity function, so as to screen a result with small similarity as the basis for the number of additions of sensors, mainly to ensure the integrity of wind and light detection to the greatest extent.

In the embodiments, for example, if the calculated number of additions is 1 and 2 respectively, the total number of additions is 1+2=3. At this time, 3 is regarded as the same number of additions to realize the setting of the sensor.

In the embodiments, the influence features are mainly based on the features of the circuit connection and the influence caused by the environment in the process of generating energy from different energy sources.

The above technical scheme has the following beneficial effects: the influence features corresponding to different influence results are determined through the result analysis mechanism, and the addition number corresponding to each feature pair is determined by calculating the feature similarity, so as to realize the total addition of different sensors, ensure the rationality of sensor construction, and provide a basis for measurement and subsequent power adjustment.

The power control method for wind power and photovoltaic combined power generation is provided, obtaining a current operation characteristic of the power generation system includes:

a first connection layout of a wind power photovoltaic receiving end and a second connection layout of a wind power photovoltaic converting end in the power generation system are obtained;

current wind collection data and current light collection data are determined, and simultaneously, a wind battery pack usage situation and a light battery pack usage situation in the power generation system are determined;

the current wind collection data and the wind battery pack usage situation are performed a first processing based on the first connection layout and the second connection layout, and simultaneously, the current light collection data and the light battery pack usage situation are performed a second processing;

a first target power is determined according to the wind battery pack usage situation, and a second target power is determined according to the light battery pack usage situation;

the first target power and the second target power are compared with a mode power of a current working mode of the power generation system to determine a power difference sequence group of the power generation system;

a collection-use sequence group is determined according to a first processing result and a second processing result;

based on the power difference sequence group and based on the collection-use sequence group, the current operation characteristic of the power generation system is determined.

In the embodiments, the power generation system includes a wind power photovoltaic receiving end and a wind power photovoltaic converting end.

The first connection layout and the second connection layout refer to the connection circuit in operation.

In the embodiments, the wind collection data refers to the wind signal collected based on the wind intensity sensor, and the light collection data refers to the light signal collected based on the light intensity sensor.

In the embodiments, the battery pack usage situation refers to the corresponding battery energy storage situation, wind, light and electricity conversion situation and the electric energy usage situation of the battery in the process of wind power conversion and photovoltaic conversion.

In the embodiments, the first processing and the second processing are to associate the collected data with the related energy of the battery itself.

Where, the first processing result and the second processing result are based on the combination of the adopted data and the battery usage situation, and then the collection power and the usage power can be determined, and then the collection-use sequence group can be obtained. The target power is a value actually determined currently. By comparing it with the standard power in this mode, a power difference sequence group can be obtained, including the first target power and mode power, the second target power and mode power, and the corresponding differences.

In the embodiments, the current operation characteristic is comprehensively realized based on different sequence groups, so as to determine the actual operation feature of the current system and provide a basis for subsequent power adjustment.

The above technical scheme has the following beneficial effects: by determining the connection layout of different ends, and respectively determining the sequence group from two aspects according to the collected data and the battery pack usage situation, that is, the collection-use sequence group and the power difference sequence group. Then the current operation characteristic of the power generation system is determined, the practicality of obtaining the operation characteristics can be ensured, an effective basis can be provided for subsequent power adjustment, and the efficiency of the combined operation of wind power and photovoltaic can be ensured.

The power control method for wind power and photovoltaic combined power generation is provided, the determining the first power adjustment amount for the power generation system based on the wind parameters includes:

a first collection array based on the wind parameters is constructed;

the first collection array is performed a parameter analysis to obtain an allowable maximum power and an allowable minimum power;

a first operation power based on a wind power generation in the power generation system is obtained;

when the first operation power is less than the allowable minimum power corresponding to the first collection array, a first difference value corresponding to both the first operation power and the allowable minimum power is obtained as a first power adjustment amount;

when the first operation power is less than the allowable maximum power corresponding to the first collection array and greater than the allowable minimum power corresponding to the first collection array, a second difference value of the first operation power based on the allowable maximum power corresponding to the first collection array and a third difference value based on the allowable minimum power corresponding to the first collection array are obtained;

a larger difference value between the second difference value and the third difference value is obtained, the larger difference value is adjusted according to a proportion of concentrated parameters of the first collection array, and the larger difference value is superimposed based on the allowable minimum power and a adjusted difference value, and a fourth difference value between a superposition result and the first operation power is taken as the first power adjustment amount.

In the embodiments, each collection array includes several different collection parameters, and then different powers are obtained according to the different collection parameters.

The difference value refers to the absolute value difference between different powers.

In the embodiments, for example, there is a difference value between a1 and a2, and a1 is greater than a2. Then, according to the proportion of concentrated parameters, for example, it is ½. At this time, a1 is adjusted according to the proportion, and a3 is obtained. The allowable minimum power is superimposed with a3, and compared with the first operation power, and the absolute value of the obtained difference value is taken as the first power adjustment amount, and $a3=a1(1+½)$.

The above technical scheme has the following beneficial effects: the boundary value of allowable power is determined according to the collection array, and whether it can be used as a power adjustment amount is determined through power comparison, so as to ensure the rationality of the finally obtained power adjustment amount, provide a basis for power adjustment, and ensure the high efficiency of combined operation of wind power and photovoltaic.

The power control method for wind power and photovoltaic combined power generation is provided, obtaining the optimal power ratio condition under the current operation characteristic includes:

a first power generation value related to a wind power generation is determined, and simultaneously a second power generation value related to a photovoltaic power generation is determined according to the current operation characteristic;

a power generation ratio is determined based on the first power generation value and the second power generation value, and simultaneously a standard ratio of the power generation system is obtained;

a value comparison, a molecular comparison and a denominator comparison are performed based on the power generation ratio and the standard ratio, the power generation ratio is optimized to obtain the optimal power ratio condition.

In the embodiments, the first power generation value is b1, the second power generation value is b2, and the power generation ratio is b1/b2.

The standard ratio is b3/b4. At this time, the power generation ratio is optimized by determining the difference value between b1/b2 and b3/b4, the difference value between b1 and b3, and the difference value between b2 and b4. In the process of obtaining the power generation ratio, there is no divisor between numerator and denominator.

The above technical scheme has the following beneficial effects: through performing the value comparison, the molecular comparison and the denominator comparison, the optimization of power generation ratio can be better realized, and the optimal power ratio condition can be obtained, which provides an effective basis for subsequent power adjustment and indirectly ensures the high efficiency of combined operation of wind power and photovoltaic.

The power control method for wind power and photovoltaic combined power generation is provided, determining a power control instruction for a current power output value of the power generation system based on the first power adjustment amount and the second power adjustment amount according to the optimal power ratio condition includes:

the current power output value of the power generation system is obtained;

an initial wind power and an initial photovoltaic power of the power generation system are obtained;

power loss factors of the power generation system is simultaneously obtained;

a first ratio is obtained based on the initial wind power and the first power adjustment amount and the initial photovoltaic power and the second power adjustment amount, and the first ratio is adjusted based on the power loss factors to obtain a second ratio;

the second ratio is compared with the optimal power ratio condition to determine difference information, and the current power output value is combined to generate the power control instruction.

In the embodiments, the current power output value can be measured directly based on the power generation system.

In the embodiments, the initial wind power and the initial photovoltaic power are powers obtained by initial measurement when the power generation system is in normal operation, and the first ratio=(initial wind power+first power adjustment amount)/(initial photovoltaic power+second power adjustment amount).

In the embodiments, the power loss factors are the adjustment of the first ratio itself, and the second ratio=the first ratio (1—power loss factor), and the value of the power loss factor is between (0, 0.02).

In the embodiments, the second ratio is compared with the power ratio condition (ratio) to determine the difference information, and then generate the power control instruction, that is, the determined ratio difference, the power difference of numerator and denominator, etc.

The above technical scheme has the following beneficial effects: the second ratio is obtained by determining the initial power and the loss factors, and then by combining with the optimal power ratio condition and the current power output value, it is convenient to obtain a reasonable power generation instruction and realize power adjustment.

The power control method for wind power and photovoltaic combined power generation is provided, performing power control on power units in the power generation system includes:
  a first opening unit and a first power unit are screened from a wind power unit based on the first power adjustment amount and according to a minimum loss standard, and meanwhile, a second opening unit and a second power unit are screened from a photovoltaic unit based on the second power adjustment amount and according to the minimum loss standard;
  the power control instruction is analyzed and corresponding control codes are configured for each of units;
  a corresponding unit is controlled to perform a power adjustment operation based on the control codes.

In the embodiments, the minimum loss standard is set in advance, and the first opening unit and the first power unit refer to the units that need to adjust the power.

In the embodiments, instruction analysis facilitates the configuration of control codes for each unit to realize the adjustment operation.

The above technical scheme has the following beneficial effects: according to the minimum loss standard and based on the power adjustment amount, the unit to be adjusted is determined, and then the control codes are configured, so as to realize power adjustment and ensure the high efficiency of the combined operation of wind power and photovoltaic.

The power control method for wind power and photovoltaic combined power generation is provided, adjusting the first ratio based on the power loss factors to obtain the second ratio includes:

$$Y4=Y0\times(1-e^{-\Sigma h});$$

where, Y0 represents the first ratio; Σh represents all the power loss factors; $1-e^{-\tau h}$ represents a ratio adjustment coefficient; Y4 represents the second ratio.

The above technical scheme has the following beneficial effects: the second ratio can be easily obtained through the above calculation, which provides a basis for subsequent power adjustment.

Apparently, those skilled in the art can make various amendments and variations to the disclosure without departing from the spirit and scope of the disclosure. In this way, if these amendments and variations of the disclosure are within the scope of the claims of the disclosure and their equivalents, the disclosure is also intended to include these amendments and variations.

What is claimed is:

1. A power control method for wind power and photovoltaic combined power generation, comprising:
  step 1: obtaining wind parameters and light intensity parameters of a wind power photovoltaic combined power generation system, and simultaneously obtaining a current operation characteristic of the power generation system;
  step 2: determining a first power adjustment amount for the power generation system based on the wind parameters, and determining a second power adjustment amount for the power generation system based on the light intensity parameters;
  step 3: obtaining an optimal power ratio condition under the current operation characteristic;
  step 4: determining a power control instruction for a current power output value of the power generation system based on the first power adjustment amount and the second power adjustment amount according to the optimal power ratio condition, and performing power control on power units in the power generation system;
  wherein, the obtaining a current operation characteristic of the power generation system comprises:
  obtaining a first connection layout of a wind power photovoltaic receiving end and a second connection layout of a wind power photovoltaic converting end in the power generation system;
  determining current wind collection data and current light collection data, and simultaneously determining a wind battery pack usage situation and a light battery pack usage situation in the power generation system;
  performing a first processing on the current wind collection data and the wind battery pack usage situation based on the first connection layout and the second connection layout, and simultaneously performing a second processing the current light collection data and the light battery pack usage situation;
  determine a first target power according to the wind battery pack usage situation, and simultaneously determining a second target power according to the light battery pack usage situation;
  comparing the first target power and the second target power with a mode power of a current working mode of the power generation system to determine a power difference sequence group of the power generation system;
  determining a collection-use sequence group according to a first processing result and a second processing result;
  determining the current operation characteristic of the power generation system based on the power difference sequence group and based on the collection-use sequence group.

2. The power control method for wind power and photovoltaic combined power generation according to claim 1, wherein the obtaining wind parameters and light intensity parameters of the wind power photovoltaic combined power generation system comprises:
  obtaining a system structure diagram of the power generation system and a position structure diagram of the power generation system;
  performing a first analysis on the power generation system based on the system structure diagram to determine a first position to be set based on the power generation system;
  performing a second analysis on the power generation system based on the position structure diagram to determine a second position to be set based on the power generation system;
  obtaining historical environmental information of a position of the power generation system being located, analyzing the historical environmental information, classifying environmental occurrence states, and respectively determining a detection bias corresponding to each type of occurrence states;

setting third positions to be detected corresponding to each type of occurrence states based on the detection bias and combined with the position structure diagram, and setting a state-bias weight for each of the third positions to be detected;

screening a first sub-position with the state-bias weight corresponding to each type of occurrence states greater than a preset weight, and simultaneously overlapping labeling the third positions to be detected corresponding to each type of occurrence states to obtain second sub-positions;

analyzing a setting feasibility of each of the second sub-positions, and screening to obtain a third sub-position;

$$Y1 = (1-\alpha) \times \sum_{i1=1}^{n1} r_{i1} \times e^{\sum_{i1=1}^{n1} p_{i1}};$$

wherein, Y1 represents the setting feasibility corresponding to the second sub-positions; $\alpha$ represents a calculation error factor for a calculation of feasibility, and a value range is [0, 0.01]; n1 represents a number of overlapping times corresponding to the second sub-positions; $r_{i1}$ represents a state-bias weight corresponding to an i1 overlapping label in corresponding to the second sub-positions; $p_{i1}$ represents an occurrence probability of a weather state corresponding to the i1 overlapping label in corresponding to the second sub-positions;

determining a light deployment and a wind deployment of the third sub-position based on the power generation system, and analyzing a first influence result of the light deployment based on the first position to be set and a second influence result of the wind deployment based on the second position to be set;

determining adjustment information based on the first influence result and the second influence result according to a result analysis mechanism;

removing redundant overlapping positions from the first position to be set, the second position to be set, the first sub-position and the third sub-positions to obtain a setting position to be confirmed;

performing device adjustment on the setting position to be confirmed based on the adjustment information to obtain a device setting position;

performing a wind power detection and a light intensity detection according to a light intensity detection sensor and a wind intensity detection sensor set at the device setting position to obtain corresponding the wind parameters and the light intensity parameters.

3. The power control method for wind power and photovoltaic combined power generation according to claim 2, wherein the determining adjustment information based on the first influence result and the second influence result according to the result analysis mechanism comprises:

constructing a first influence feature of the first influence result and constructing a second influence feature of the second influence result based on the result analysis mechanism;

calculating feature similarity SimA of the first influence feature and the second influence feature;

$$A = \{sim(s1_{j1}, s2_{j2}), j1=1,2,3, \ldots, n1; j2=1,2,3, \ldots, n2\};$$

simultaneously screening a feature pair corresponding to first n minimum similarity features, and respectively calculating a total weight corresponding to the feature pair;

calculating a number of additions according to a following formula when the total weight is greater than a preset threshold:

$$H1 = \left[\frac{Q_{ZONG}}{Q_Y} \times (1 - simB)\right];$$

wherein H1 represents the number of additions corresponding to a corresponding feature pair B; $Q_{ZONG}$ represents the total weight of the corresponding feature pair B; $Q_Y$ represents the preset threshold; simB represents the feature similarity of the corresponding feature pair B; [ ] represents an integer symbol;

respectively performing a same number of additions of light intensity detection sensors and wind intensity detection sensors to the power generation system according to a total number of additions;

otherwise, judging that no additional sensor is required.

4. The power control method for wind power and photovoltaic combined power generation according to claim 1, wherein the determining the first power adjustment amount for the power generation system based on the wind parameters comprises:

constructing a first collection array based on the wind parameters;

performing a parameter analysis on the first collection array to obtain an allowable maximum power and an allowable minimum power;

obtaining a first operation power based on a wind power generation in the power generation system;

when the first operation power is less than the allowable minimum power corresponding to the first collection array, obtaining a first difference value corresponding to the two as a first power adjustment amount;

when the first operation power is less than the allowable maximum power corresponding to the first collection array and greater than the allowable minimum power corresponding to the first collection array, obtaining a second difference value of the first operation power based on the allowable maximum power corresponding to the first collection array and a third difference value based on the allowable minimum power corresponding to the first collection array;

obtaining a larger difference value between the second difference value and the third difference value, adjusting the larger difference value according to a proportion of concentrated parameters of the first collection array, and superimposing the larger difference value based on the allowable minimum power and a adjusted difference value, and taking a fourth difference value between a superposition result and the first operation power as the first power adjustment amount.

5. The power control method for wind power and photovoltaic combined power generation according to claim 1, wherein the obtaining the optimal power ratio condition under the current operation characteristic comprises:

determining a first power generation value related to a wind power generation, and simultaneously determining a second power generation value related to a photovoltaic power generation according to the current operation characteristic;

determining a power generation ratio based on the first power generation value and the second power generation value, and simultaneously obtaining a standard ratio of the power generation system;

performing a value comparison, a molecular comparison and a denominator comparison based on the power generation ratio and the standard ratio, optimizing the power generation ratio to obtain the optimal power ratio condition.

6. The power control method for wind power and photovoltaic combined power generation according to claim 1, wherein the determining a power control instruction for a current power output value of the power generation system based on the first power adjustment amount and the second power adjustment amount according to the optimal power ratio condition comprises:

obtaining the current power output value of the power generation system;

obtaining an initial wind power and an initial photovoltaic power of the power generation system;

simultaneously obtaining power loss factors of the power generation system;

obtaining a first ratio based on the initial wind power and the first power adjustment amount and the initial photovoltaic power and the second power adjustment amount, and adjusting the first ratio based on the power loss factors to obtain a second ratio;

comparing the second ratio with the optimal power ratio condition to determine difference information, and combining the current power output value to generate the power control instruction.

7. The power control method for wind power and photovoltaic combined power generation according to claim 1, wherein the performing power control on power units in the power generation system comprises:

screening a first opening unit and a first power unit from a wind power unit based on the first power adjustment amount and according to a minimum loss standard, and meanwhile, screening a second opening unit and a second power unit from a photovoltaic unit based on the second power adjustment amount and according to the minimum loss standard;

analyzing the power control instruction and configuring corresponding control codes to each of units;

controlling a corresponding unit to perform a power adjustment operation based on the control codes.

8. The power control method for wind power and photovoltaic combined power generation according to claim 6, wherein the adjusting the first ratio based on the power loss factors to obtain the second ratio comprises:

$$Y4 = Y0 \times (1 - e^{-\Sigma h});$$

wherein, $Y0$ represents the first ratio; $\Sigma h$ represents all the power loss factors; $1-e^{-\Sigma h}$ represents a ratio adjustment coefficient; $Y4$ represents the second ratio.

* * * * *